United States Patent
Jung et al.

(10) Patent No.: US 9,025,829 B2
(45) Date of Patent: May 5, 2015

(54) IMAGE SENSOR, OPERATION METHOD THEREOF AND APPARATUSES INCLUDING THE SAME

(71) Applicant: Samsung Electronics Co., Ltd., Suwon-Si, Gyeonggi-Do (KR)

(72) Inventors: Jung Kyu Jung, Seoul (KR); Yoon Dong Park, Yongin-si (KR); Tae Yon Lee, Seoul (KR); Chil Hee Chung, Seoul (KR); Young Gu Jin, Osan-si (KR); Hyun Seok Lee, Hwaseong-si (KR); Seung Hyuk Chang, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 237 days.

(21) Appl. No.: 13/672,042

(22) Filed: Nov. 8, 2012

(65) Prior Publication Data
US 2013/0123015 A1   May 16, 2013

(30) Foreign Application Priority Data

Nov. 15, 2011   (KR) .......................... 10-2011-0118647

(51) Int. Cl.
| | | |
|---|---|---|
| *G06K 9/00* | (2006.01) | |
| *G06K 9/78* | (2006.01) | |
| *H04N 5/335* | (2011.01) | |
| *G01S 17/02* | (2006.01) | |
| *G01S 17/89* | (2006.01) | |
| *G01S 7/486* | (2006.01) | |
| *G06K 9/20* | (2006.01) | |
| *H04N 5/369* | (2011.01) | |

(52) U.S. Cl.
CPC ................. *G06K 9/78* (2013.01); *H04N 5/335* (2013.01); *G01S 17/023* (2013.01); *G01S 17/89* (2013.01); *G01S 7/4863* (2013.01); *G06K 9/209* (2013.01); *H04N 5/3696* (2013.01)

(58) Field of Classification Search
None
See application file for complete search history.

(56) References Cited

U.S. PATENT DOCUMENTS

| | | | |
|---|---|---|---|
| 6,765,618 B1* | 7/2004 | Sato ............................... 348/348 |
| 8,379,101 B2* | 2/2013 | Mathe et al. ................ 348/222.1 |
| 8,692,887 B2* | 4/2014 | Ringermacher et al. ...... 348/164 |
| 2002/0158812 A1* | 10/2002 | Pallakoff ........................... 345/5 |
| 2003/0025821 A1* | 2/2003 | Bean et al. ..................... 348/345 |
| 2003/0063185 A1* | 4/2003 | Bell ................................. 348/46 |
| 2005/0257748 A1* | 11/2005 | Kriesel et al. .............. 119/51.02 |
| 2005/0285962 A1* | 12/2005 | Cornejo ..................... 348/333.01 |
| 2006/0202038 A1* | 9/2006 | Wang et al. .............. 235/462.24 |
| 2006/0242186 A1* | 10/2006 | Hurley ............................ 707/102 |
| 2007/0047839 A1* | 3/2007 | Watanabe et al. ............. 382/291 |
| 2010/0020209 A1* | 1/2010 | Kim ................................ 348/294 |
| 2010/0073462 A1* | 3/2010 | Lee et al. ......................... 348/46 |

(Continued)

FOREIGN PATENT DOCUMENTS

| | | | |
|---|---|---|---|
| JP | 2008116309 A | 5/2008 |
| JP | 2010281811 A | 12/2010 |

(Continued)

*Primary Examiner* — Shervin Nakhjavan
(74) *Attorney, Agent, or Firm* — Harness, Dickey & Pierce, P.L.C.

(57) ABSTRACT

An operation method of an image sensor includes determining a distance between the image sensor and an object, and activating at least one of a color pixel, a depth pixel and a thermal pixel included in a pixel array of the image sensor based on a determined distance and a reference distance.

15 Claims, 13 Drawing Sheets

(56) References Cited

U.S. PATENT DOCUMENTS

| | | |
|---|---|---|
| 2010/0079581 A1* | 4/2010 | Russell et al. .................. 348/46 |
| 2010/0123771 A1* | 5/2010 | Moon et al. .................... 348/46 |
| 2010/0191541 A1* | 7/2010 | Prokoski ........................... 705/2 |
| 2010/0260374 A1* | 10/2010 | Akashi et al. ................. 382/100 |
| 2011/0089325 A1* | 4/2011 | Ottney .......................... 250/333 |
| 2011/0202310 A1* | 8/2011 | Min et al. ..................... 702/166 |
| 2011/0285825 A1* | 11/2011 | Tian et al. ...................... 348/47 |
| 2012/0075463 A1* | 3/2012 | Chen et al. ................... 348/135 |
| 2012/0257060 A1* | 10/2012 | Bos et al. ...................... 348/148 |
| 2012/0326959 A1* | 12/2012 | Murthi et al. ................. 345/156 |
| 2013/0162836 A1* | 6/2013 | Strandemar et al. .......... 348/164 |
| 2013/0335725 A1* | 12/2013 | Hardegger et al. ............ 356/5.1 |
| 2014/0204179 A1* | 7/2014 | Atkinson ........................ 348/46 |

FOREIGN PATENT DOCUMENTS

| | | |
|---|---|---|
| KR | 20100011676 A | 2/2010 |
| KR | 101012691 B1 | 2/2011 |

\* cited by examiner

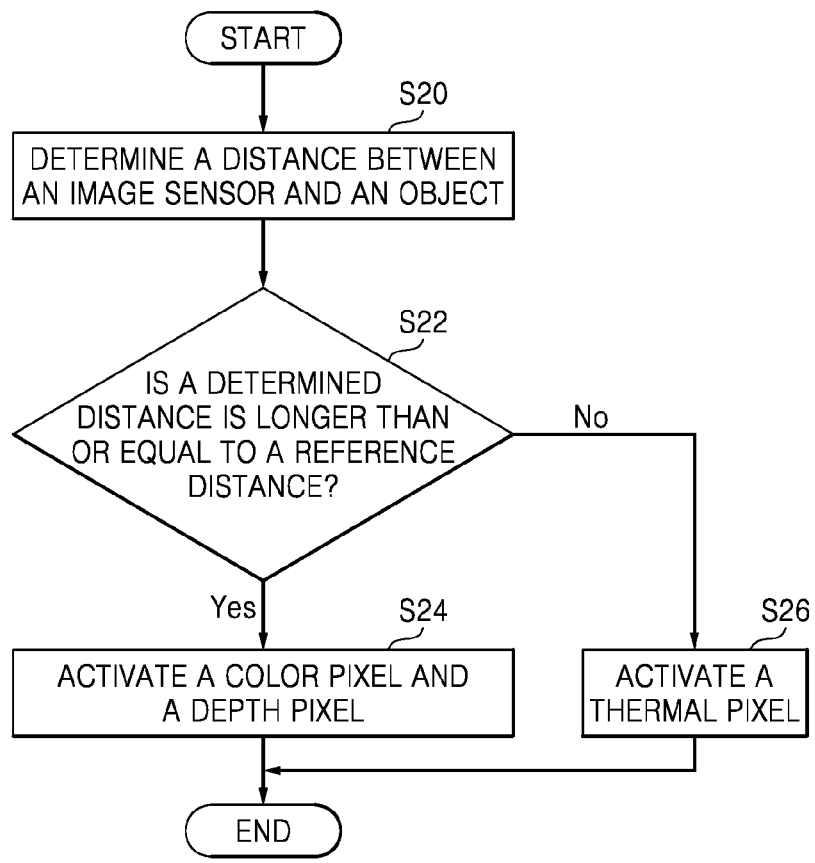

IMAGE SENSOR, OPERATION METHOD THEREOF AND APPARATUSES INCLUDING THE SAME

CROSS-REFERENCE TO RELATED APPLICATIONS

This application claims priority under 35 U.S.C. §119 to Korean Patent Application No. 10-2011-0118647 filed on Nov. 15, 2011, the disclosure of which is hereby incorporated by reference in its entirety.

BACKGROUND

Example embodiments of the inventive concepts relate to an operation method of an image sensor and/or apparatuses including the same, and more particularly, to an image sensor including a pixel array, which includes a color pixel, a depth pixel and a thermal pixel, an operation method thereof, and/or apparatuses having the same.

An image sensor is a device converting an optical image into an electrical signal. Recently, the computer and communication industries are developing demands for an image sensor having an improved performance in various devices such as a digital camera, a camcorder, a personal communication system (PCS), a game device, a security camera, a medical micro-camera, a robot, etc.

To acquire a three-dimensional image using an image sensor, information on depth or distance between a target object and an image sensor as well as information on color is required. A method of getting information on the distance between the target object and the image sensor may be generally divided into an active method and a passive method.

There are a time-of-flight (TOF) method and a triangulation method in an active method. A TOF method detects a phase change of an emitted light when the emitted light having a modulated waveform is reflected and returned from a target object. Here, the phase change may be calculated by an amount of charges occurred in a photoelectric element like a photo diode included in a depth pixel array.

A triangulation method senses a light emitted by a light source, e.g., a laser, at a fixed distance from an image sensor and reflected by a target object, and calculates a distance between the target object and the image sensor by triangulating a sensing result where a distance between the image sensor and the light source is already known.

A passive method calculates a distance between a target object and an image sensor by only using image information of the target object and without emitting a light to the target object. A stereo camera is a representative example where the passive method is applied.

A method of determining a thermal image of an object may include a bolometric technique and a photo detection element technique. In a bolometric technique, an electrical resistance of a bolometer is changed by heat of an object. The electrical resistance may change linearly in proportion to temperature of the object. A photo detection element technique detects a change of an amount of charges occurring in a photo detection element as the photo detection element absorbs an electromagnetic wave produced by heat of an object. Intensity of a thermal signal may decrease in inverse proportion to the square of a distance to an object.

SUMMARY

An embodiment of the inventive concepts is directed to an operation method of an image sensor, including determining a distance between the image sensor and a object and activating at least one of a color pixel, a depth pixel and a thermal pixel included in a pixel array of the image sensor according to a result of comparing a determined distance and a reference distance. According to an example embodiment, the activating may activate the thermal pixel if the determined distance is shorter than the reference distance, and may activate the color pixel and the depth pixel if the determined distance is longer than the reference distance.

An embodiment of the inventive concepts is directed to an image sensor, including a pixel array. The pixel array may include a color pixel configured to detect information on color of an object, a depth pixel configured to detect information on depth of the object, and a thermal pixel configured to detect thermal information of the object.

According to an example embodiment, the image sensor further include a control unit configured to compare the depth information with a reference distance and activate at least one of the color pixel, the depth pixel and the thermal pixel according to a comparison result.

According to an example embodiment, the depth information may include information on a distance between the image sensor and the object, and the control unit may be configured to activate the thermal pixel if the distance between the image sensor and the object is shorter than the reference distance, and activate the color pixel and the depth pixel if the distance between the image sensor and the object is longer than the reference distance.

According to an example embodiment, the color pixel and the depth pixel may be included together in a first unit pattern, and the thermal pixel may be included in a second unit pattern. According to an example embodiment, the color pixel, the depth pixel and the thermal pixel may be included in different layers, respectively. According to an example embodiment, the color pixel and the depth pixel may be included in a first layer and the thermal pixel may be included in a second layer.

According to an example embodiment, the first layer may include a plurality of unit patterns, and each of the plurality of unit patterns may include the color pixel and the depth pixel together.

An example embodiment of the inventive concepts is directed to an image processing device, including an image sensor and a controller configured to control the image sensor. The image sensor may include a pixel array and the pixel array may include a color pixel configured to detect color information of an object, a depth pixel configured to detect depth information of the object, and a thermal pixel configured to detect thermal information of the object.

An example embodiment of the inventive concepts is directed to a portable device, including an image sensor, a controller configured to control the image sensor, and a display configured to display an image based on an output signal output from the image sensor. The image sensor may include a pixel array, and the pixel array may include a color pixel configured to detect color information of an object, a depth pixel configured to detect depth information of the object and a thermal pixel configured to detect thermal information of the object.

An example embodiment of the inventive concepts is directed to a user interface device, including the image sensor, an object recognition module configured to recognize the object based on at least one of the color information, the depth information and the thermal information, a motion extracting module configured to extract a motion of the object from a recognized object, a command processing module configured to compare an extracted motion with a plurality of reference motions stored in a memory and generate a command signal corresponding to a reference motion based on a result of the comparison. The image sensor may include a pixel array, and the pixel array may include a color pixel configured to detect color information of an object, a depth pixel configured to detect depth information of the object, and a thermal pixel configured to detect thermal information of the object. According to an example embodiment, the user interface device may be a console game controller.

An example embodiment of the inventive concepts is directed to an image sensor including a color pixel, a depth pixel, a thermal pixel; and a control unit configured to control of the image sensor based on depth information of an object.

According to an example embodiment, the image sensor may further include a light source configured to generate light detected by the depth pixel, and an image signal processor configured to receive color information, depth information, and thermal information of the object.

According to an example embodiment, the image signal processor may be further configured to process the depth information and send data including the depth information to the control unit, the data indicating a distance between the object and the image sensor.

According to an example embodiment, the control unit may be configured to activate the thermal pixel and deactivate the color pixel and the depth pixel if the distance between the object and the image sensor is less than a reference distance.

According to an example embodiment, the control unit may be configured to activate the color pixel and the depth pixel and deactivate the thermal pixel if the distance between the object and the image sensor is greater than or equal to the reference distance.

According to an example embodiment, the thermal pixel may be in a thermal pixel array of the image sensor, the depth pixel may be in a depth pixel array of the image sensor, and the color pixel may be in a color pixel array of the image sensor.

According to an example embodiment, the color pixel is in a first unit pattern, the depth pixel is in a second unit pattern, and the thermal pixel is in third unit pattern.

BRIEF DESCRIPTION OF THE DRAWINGS

The above and other features and advantages of the inventive concepts will become more apparent upon consideration of example embodiments with reference to the attached drawings in which:

FIG. 12 is a flowchart illustrating a method of operating the image sensor illustrated in FIG. 2B according to another example embodiment of the inventive concepts.

DETAILED DESCRIPTION OF EXAMPLE EMBODIMENTS

Figure 1:
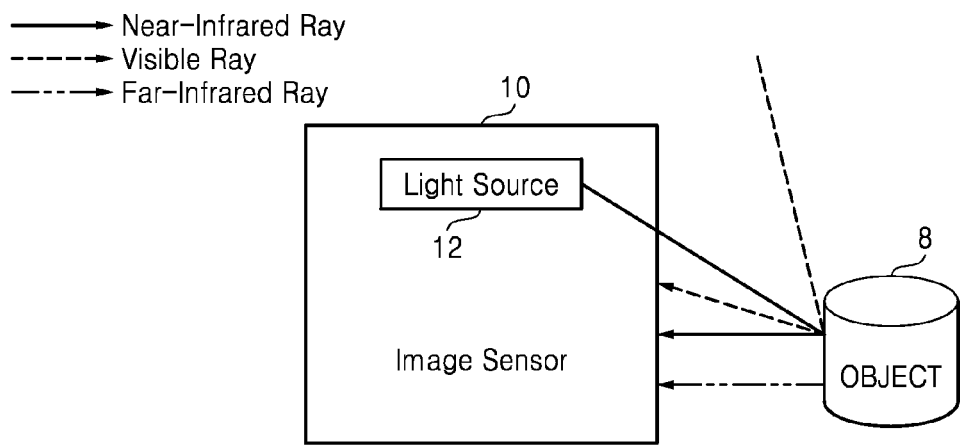
FIG. 1 is a conceptual diagram of an image sensor according to an example embodiment of the inventive concepts.

The inventive concepts will now be described in some additional detail with reference to the accompanying drawings that illustrate certain exemplary embodiments. These inventive concepts may, however, be embodied in many different forms and should not be construed as being limited to only the illustrated embodiments. Rather, these example embodiments are provided so that this disclosure will be thorough and complete, and will fully convey the scope of the inventive concepts to those skilled in the art. Throughout the drawings like reference numbers and labels are used to indicate like or similar elements and related signals.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

A module in example embodiments may mean a functional or a structural combination of hardware for executing a method according to an example embodiment of the inventive concepts and software which may drive the hardware. Accordingly, the module may mean a logical unit or set of a program code and a hardware resource which may perform the program code.

FIG. 1 is a conceptual diagram of an image sensor according to an example embodiment of the inventive concepts. Referring to FIG. 1, an image sensor 10 may include a light source 12.

The image sensor 10 may determine color information of the object 8 by sensing a light, e.g., a visible ray, reflected by an object 8. According to an example embodiment, the object 8 may be a moving object, person or a part of the body of the person. The image sensor 10 may determine thermal information of the object 8 by sensing an infrared ray, e.g., a far-infrared ray, generated from an object 8.

The light source 12 generates a pulse of light, e.g., a modulated pulse of light, to the object 8. According to an example embodiment, the light source 12 may include a plurality of infrared light emitting diodes (IR LED).

When a pulse of light, e.g., a near-infrared ray, generated from the light source 12 is reflected by the object 8, the image sensor 10 may sense a reflected pulse of light and determine depth information of an object 8. That is, the image sensor 10 may determine depth information of an object 8 using a time of flight (TOF) method for the pulse of light.

Figure 2A:
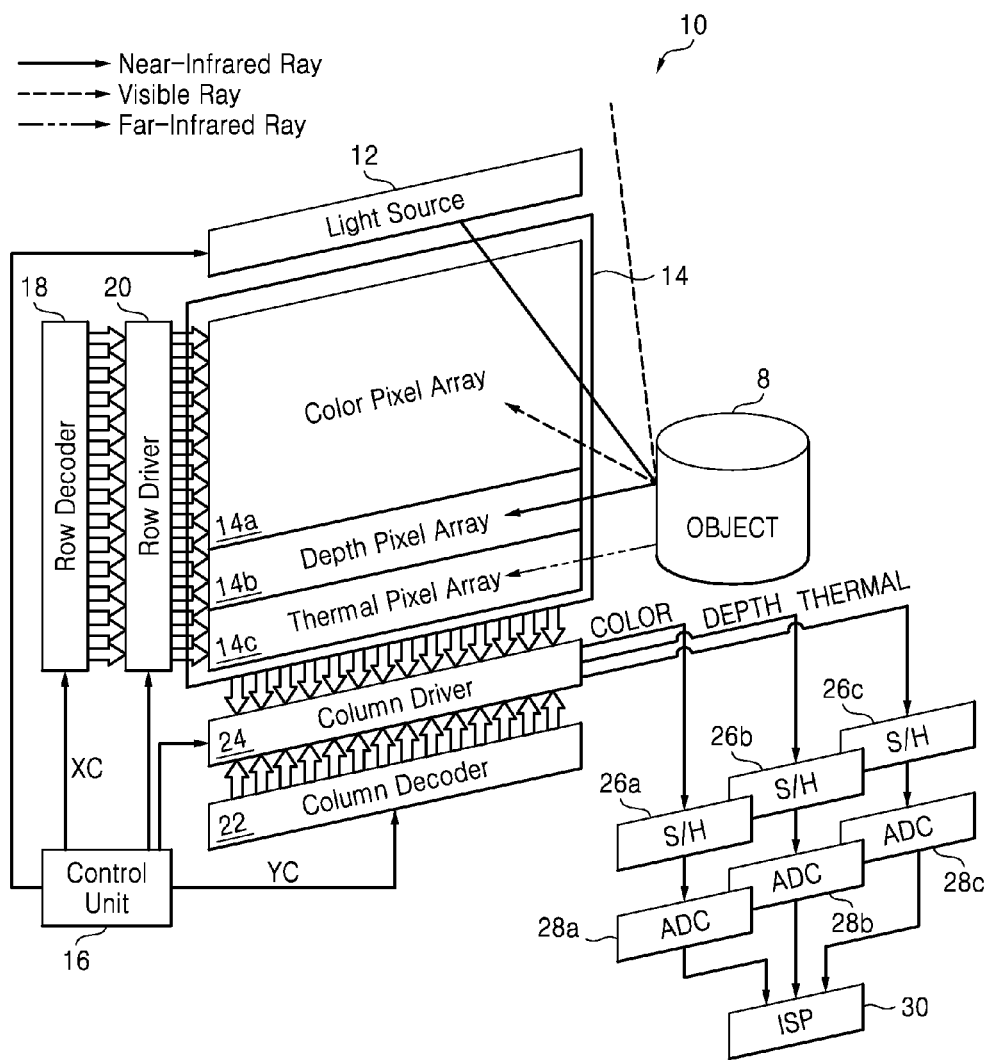
FIG. 2A is a block diagram according to an example embodiment of the image sensor illustrated in FIG. 1.

FIG. 2A is a block diagram according to an example embodiment of the image sensor illustrated in FIG. 1. Referring to FIG. 2A, the image sensor 10 includes a light source 12, a pixel array 14, control unit 16, a row decoder 18, a row driver 20, a column decoder 22, a column driver 24, a plurality of sample and hold blocks 26a, 26b and 26c, and a plurality of analog to digital converters (ADCs) 28a, 28b and 28c.

For convenience of explanation in FIG. 2A, it is illustrated that the image sensor 10 includes an image signal processor (ISP) 30; however, the image sensor 10 and the ISP 30 may be embodied separately according to an example embodiment.

The pixel array 14 may include a plurality of pixels arranged in a two dimensional matrix. The pixel array 14 may include a color pixel array 14a, a depth pixel array 14b and a thermal pixel array 14c.

The color pixel array 14a may sense light, e.g., a visible ray, reflected by an object 8 and detect color information of the object 8. According to an example embodiment, the color pixel array 14a may include a red pixel converting light of a red spectrum region into an electrical signal, a green pixel converting light of a green spectrum region into an electrical signal, and a blue pixel converting light of a blue spectrum region into an electrical signal. According to an example embodiment, the color pixel array 14a may also include a white pixel.

According to an example embodiment, the color pixel array 14a may include at least one of a cyan pixel, a yellow pixel and a magenta pixel.

The depth pixel array 14b may detect depth information of an object 8. The depth pixel array 14b may include a plurality of depth pixels which may sense a reflected pulse of light when a pulse of light, e.g., a near-infrared ray, generated in the light source 12 is reflected by an object 8. According to an example embodiment, the depth pixel array 14b may detect a phase change between a generated pulse of light and a pulse of light which is reflected by an object 8 and sensed, and detect depth information of the object 8 according to a detection result.

The thermal pixel array 14c may include a plurality of elements, e.g., a plurality of thermal pixels, which may sense an infrared ray emitted from an object 8. According to an example embodiment, each of the plurality of thermal pixels may be a semiconductor type using a semiconductor material or a thermal type using a material besides a semiconductor. The thermal pixel array 14c may detect thermal information of an object 8 by sensing an infrared ray, e.g., a far-infrared ray, emitted from an object 8.

An arrangement of the pixel array 14 according to example embodiments is explained in FIGS. 3 to 7.

A control unit 16 may generate a control signal XC and/or YC for controlling an operation of the light source 12, the pixel array 14, the row decoder 18, the row driver 20, the column decoder 22, the column driver 24, the plurality of sample and hold blocks 26a, 26b and 26c, and/or the plurality of ADCs 28a, 28b and 28c.

The control unit 16 may generate a plurality of row control signals XC, e.g., row address signals, for selecting a specific row line among a plurality of row lines included in the color pixel array 14a, the depth pixel array 14b and the thermal pixel array 14c.

The control unit 16 may generate a plurality of column control signals YC, e.g., column address signals, for outputting sense signals generated from a specific column line among a plurality of column lines included in the color pixel array 14a, the depth pixel array 14b and the thermal pixel array 14c. The control unit 16 may control a light source that generates a pulse of light, e.g., a near-infrared ray.

The row decoder 18 may decode a plurality of row control signals XC, e.g., row address signals, output from the control unit 16 and output a plurality of row selection signals according to a decoding result.

The row driver 20 may drive at least one of a plurality of row lines included in each of the color pixel array 14a, the depth pixel array 14b and the thermal pixel array 14c in response to each of the plurality of row selection signals output from the row decoder 18.

The column decoder 22 may decode a plurality of column control signals YC, e.g., column address signals, output from the control unit 16 and output a plurality of column selection signals according to a decoding result.

The column driver 24 may drive each of a plurality of column lines included in each of the color pixel array 14a, the depth pixel array 14b and the thermal pixel array 14c in response to each of the plurality of column selection signals output from the column decoder 22.

For convenience of explanation, the image sensor 10 is illustrated to include a row driver 20 and a column driver 24; however, the image sensor 10 may include a plurality of row drivers and/or a plurality of column drivers for driving row lines or column lines of each of the color pixel array 14a, the depth pixel array 14b and the thermal pixel array 14c. In this case, the image sensor 10 may include a plurality of row decoders and/or a plurality of column decoders.

A sample and hold block 26a may sample and hold a pixel signal COLOR output from a pixel which is selected by the row driver 20 and the column driver 24 from among a plurality of color pixels included in the color pixel array 14a. A sample and hold block 26b may sample and hold a pixel signal DEPTH output from a pixel which is selected by the row driver 20 and the column driver 24 from among a plurality of depth pixels included in the depth pixel array 14b.

A sample and hold block 26c may sample and hold a pixel signal THERMAL output from a pixel which is selected by the row driver 20 and the column driver 24 from among a plurality of thermal pixels included in the thermal pixel array 14c.

Each of the plurality of ADCs 28a, 28b and 28c may perform analog to digital conversion on signals output from each of the plurality of sample and hold blocks 26a, 26b and 26c and output analog to digital converted pixel data.

According to an example embodiment, each of the plurality of ADCs may further include a correlated double sampling (CDS) circuit (not shown) performing correlated double sampling on signals output from each of the plurality of sample and hold blocks 26a, 26b and 26c. According to an example embodiment, each of the plurality of ADCs 28a, 28b and 28c may compare a correlated double sampled signal with a ramp signal and output a comparison result as analog to digital converted pixel data.

An ISP 30 may process an image of an object 8 based on pixel data output from each of the plurality of ADCs 28a, 28b and 28c. The ISP 30 may process color information of an object 8 based on pixel data output from an ADC 28a. The ISP 30 may process depth information of an object 8 based on pixel data output from an ADC 28b. The ISP 30 may process thermal information of an object 8 based on pixel data output from an ADC 28c.

According to an example embodiment, the ISP 30 may process an improved three-dimensional image, a three-dimensional color image, a 3-D thermal image or a 2-D thermal color image of an object 8 based on pixel data output from the ADC 28a, the ADC 28b and the ADC 28c.

Figure 2B:
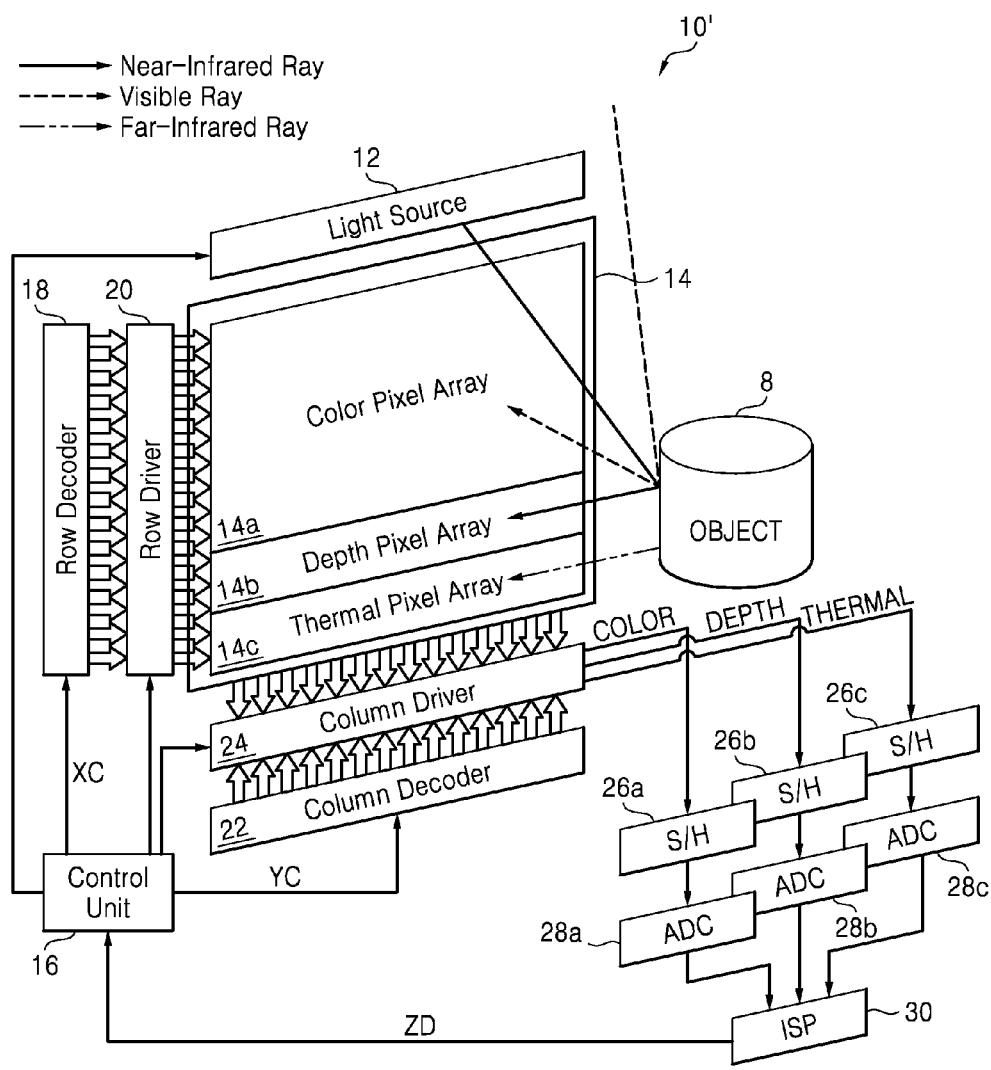
FIG. 2B is a block diagram according to another example embodiment of the image sensor illustrated in FIG. 1.

FIG. 2B is a block diagram according to another example embodiment of the image sensor illustrated in FIG. 1. Referring to FIG. 2B, the ISP 30 may transmit data ZD including depth information of an object 8 to a control unit 16.

The control unit 16 may generate a plurality of row control signals XC, e.g., row address signals, for activating at least one of the color pixel array 14a, the depth pixel array 14b and the thermal pixel array 14c based on received data ZD.

The control unit 16 may generate a plurality of column control signals YC, column address signals, for outputting sensing signals generated from at least one of the color pixel array 14a, the depth pixel array 14b and the thermal pixel array 14c based on received data ZD.

According to an example embodiment, when a distance between an image sensor 10' and an object 8 is shorter (or less) than a reference distance according to the received data ZD, the control unit 16 may generate a plurality of row control signals XC, e.g., row address signals, for activating the thermal pixel array 14c.

In this case, the control unit 16 may generate a plurality of column control signals YC, e.g., column address signals, for outputting sensing signals generated from the thermal pixel array 14c. In addition, the control unit 16 may control so that power is not supplied to the light source 12, which reduces power consumption of the image sensor 10'. Power consumption of the image sensor 10' may be further reduced because a sample and hold block 26a, a sample and hold block 26b, an ADC 28a and an ADC 28b do not operate.

According to an example embodiment, when a distance between the image sensor 10' and an object 8 is longer (or greater) than a reference distance according to the received data ZD, the control unit 16 may generate a plurality of row control signals XC, e.g., row address signals, for activating the color pixel array 14a and the depth pixel array 14b.

In this case, the control unit 16 may generate a plurality of column control signals YC, e.g., column address signals, for outputting sensing signals generated from each of the color pixel array 14a and the depth pixel array 14b. In addition, a sample and hold block 26c and an ADC 28c do not operate, which may reduce power consumption of the image sensor 10'.

According to an example embodiment, the image sensor 10' may further include a memory (not shown) storing a reference distance, which is compared to a distance from an object. The memory may be outside of the image sensor 10'.

Figure 3:
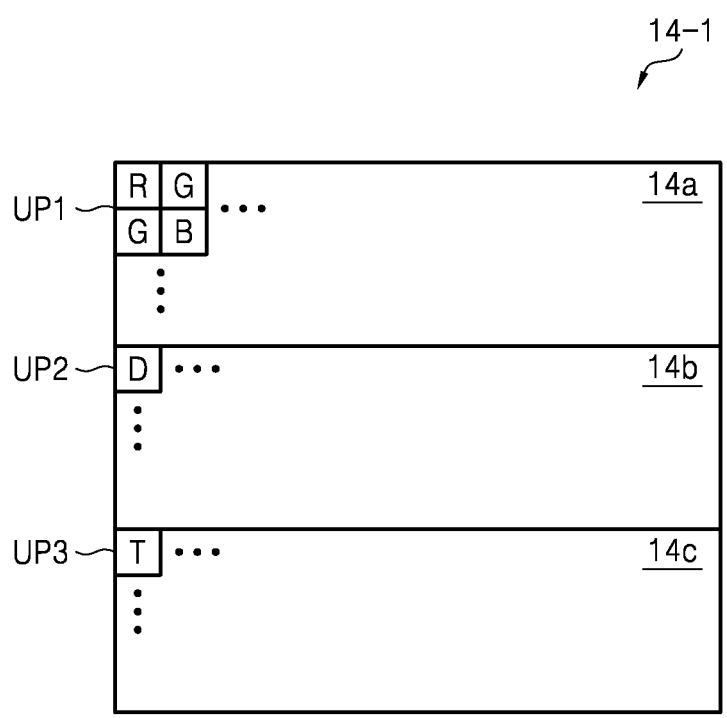
FIG. 3 depicts a structure according to an example embodiment of a pixel array of the image sensor illustrated in FIG. 2A.

FIG. 3 depicts a structure according to an example embodiment of a pixel array of the image sensor illustrated in FIG. 2A. Referring to FIGS. 2A and 3, a pixel array 14-1 may include the color pixel array 14a, the depth pixel array 14b and the thermal pixel array 14c, and each of the arrays 14a, 14b and 14c may be on the same layer.

The color pixel array 14a includes a plurality of unit pixels UP1. For convenience of explanation, an arrangement in which each of the plurality of unit pixels UP1 includes a red pixel R, a green pixel G and a blue pixel B is illustrated; however, each of the plurality of unit pixels UP1 may include at least one of a cyan pixel, a yellow pixel, a white pixel and a magenta pixel and is not restricted to the illustrated arrangement.

The depth pixel array 14b includes a plurality of unit pixels UP2. Each of the plurality of unit pixels UP2 may include a depth pixel D and the depth pixel D may sense a pulse of light, e.g., a near-infrared ray, generated in the light source 12 and reflected by an object 8.

The thermal pixel array 14c includes a plurality of unit pixels UP3. Each of the plurality of unit pixels UP3 may include a thermal pixel T and the thermal pixel T may sense an infrared ray emitted from an object 8.

According to an example embodiment, each of the plurality of unit pixels UP1, UP2 and UP3 may be a unit pattern of each of the color pixel array 14a, the depth pixel array 14b and the thermal pixel array 14c.

Figure 4:
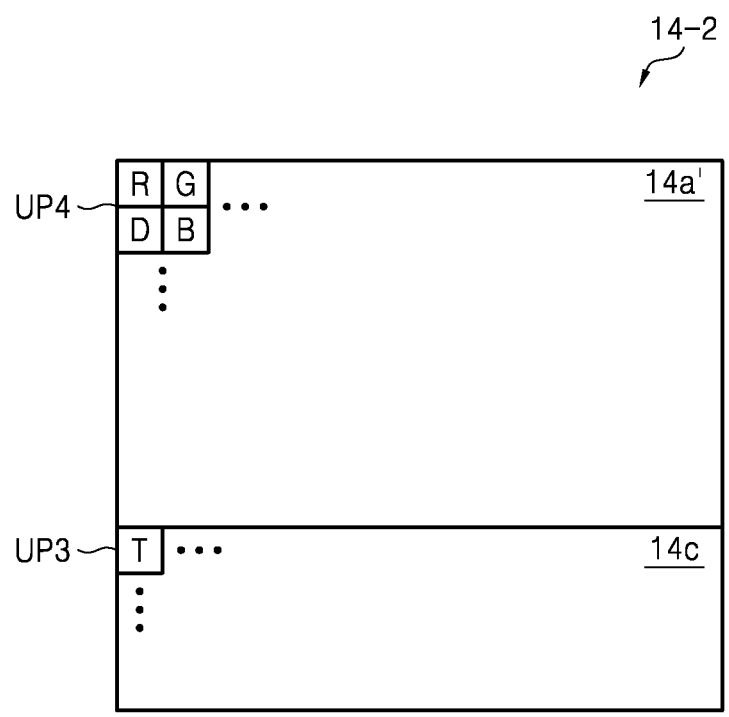
FIG. 4 depicts a structure according to another example embodiment of the pixel array of the image sensor illustrated in FIG. 2A.

FIG. 4 depicts a structure according to another example embodiment of the pixel array of the image sensor illustrated in FIG. 2A. Referring to FIG. 4, a pixel array 14-2 may include a transformed color pixel array 14a' and the thermal pixel array 14c, and each of the arrays 14a' and 14c may be included on the same layer.

The transformed color pixel array 14a' includes a plurality of unit pixels UP4. Each of the plurality of unit pixels UP4 may include a red pixel R, a green pixel G, a blue pixel B and a depth pixel D.

According to an example embodiment, each of the plurality of unit pixels UP4 may include at least one of a cyan pixel, a yellow pixel, a white pixel and a magenta pixel, and is not restricted to the illustrated arrangement. According to an example embodiment, the plurality of unit pixels UP4 may be a unit pattern of the transformed color pixel array 14a'.

Figure 5:
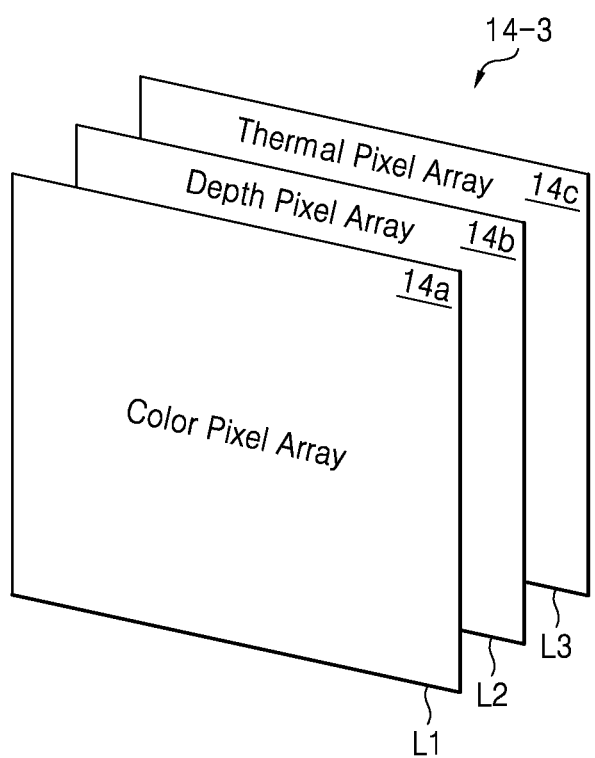
FIG. 5 depicts a structure according to still another example embodiment of the pixel array of the image sensor illustrated in FIG. 2A.

FIG. 5 depicts a structure according to still another example of the pixel array of the image sensor illustrated in FIG. 2A. Referring to FIG. 5, a pixel array 14-3 includes the color pixel array 14a, the depth pixel array 14b and the thermal pixel array 14c, and each of the arrays 14a, 14b and 14c may be on different layers L1, L2 or L3.

Figure 6:
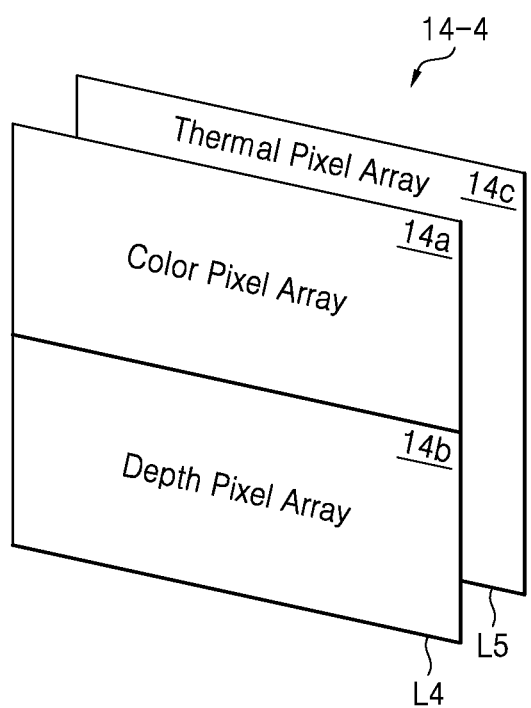
FIG. 6 depicts a structure according to still another example embodiment of the pixel array of the image sensor illustrated in FIG. 2A.

FIG. 6 depicts a structure according to still another example embodiment of the pixel array of the image sensor illustrated in FIG. 2A. Referring to FIG. 6, a pixel array 14-4 includes the color pixel array 14a, the depth pixel array 14b and the thermal pixel array 14c. The color pixel array 14a and the depth pixel array 14b may be on the same layer L4 and the thermal pixel array 14c may be on a different layer L5.

Figure 7:
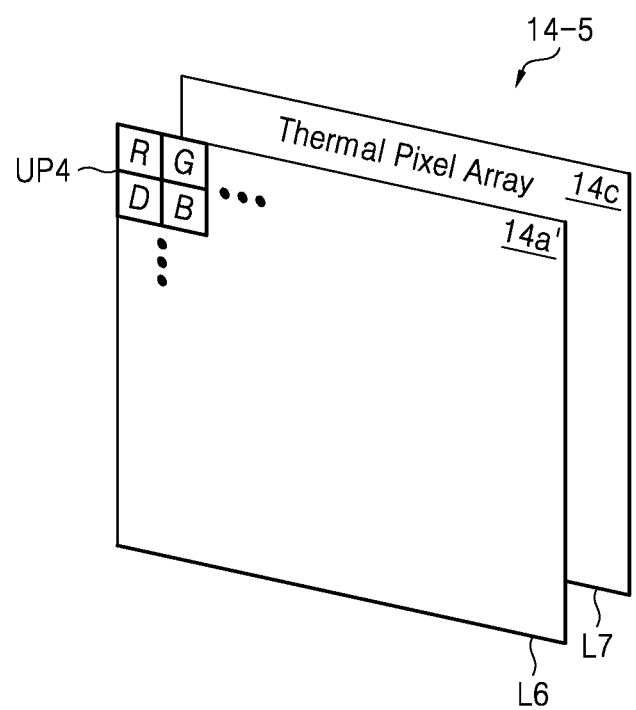
FIG. 7 depicts a structure according to still another example embodiment of the pixel array of the image sensor illustrated in FIG. 2A.

FIG. 7 depicts a structure according to still another example embodiment of the pixel array of the image sensor illustrated in FIG. 2A. Referring to FIG. 7, a pixel array 14-5 includes the transformed color pixel array 14a' and the thermal pixel array 14c. The transformed color pixel array 14a' may be on a layer L6 and the thermal pixel array 14c may be on a different layer L7.

Figure 8:
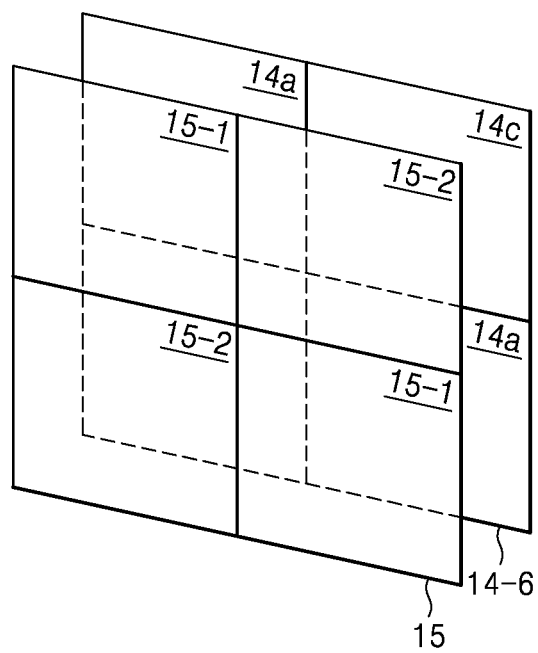
FIG. 8 depicts a structure according to still another example embodiment of the pixel array of the image sensor illustrated in FIG. 2A.

FIG. 8 depicts a structure according to still another example embodiment of the pixel array of the image sensor illustrated in FIG. 2A. Referring to FIGS. 2A and 8, when the pixel array 14 of FIG. 2A is embodied in a pixel array 14-6 illustrated in FIG. 8, the pixel array 14-6 may not include a depth pixel array 14b. In this case, the image sensor 10 of FIG. 2A may further include a lens array 15, and the image sensor 10 may operate as a part of a light field camera together with the lens array 15.

The lens array 15 may be formed at a front side of the pixel array 14-6. According to an example embodiment, the lens array 15 may include a plurality of micro lenses. The plurality of micro lenses may be patterned based on a size of each pixel included in the pixel array 14-6. Each of the plurality of micro lenses may divide light entering each of the plurality of micro lenses and pass it through the pixel array 14-6. According to another example embodiment, the lens array 15 may be embodied in a printed film or a mask.

The lens array 15 may include a first lens array 15-1 corresponding to a color pixel array 14a and a second lens array 15-2 corresponding to a thermal pixel array 14c. The first lens array 15-1 may be formed by a substance, e.g., silica(SiO2), which passes wavelength of a visible ray which may be sensed by the color pixel array 14a. The second lens array 15-2 may be formed by a substance, e.g., germanium(Ge), which passes wavelength of an infrared ray, e.g., an far-infrared ray, sensed by the thermal pixel array 14c.

According to an example embodiment, the first lens array 15-1 and the second lens array 15-2 may be formed by Potassium bromide(KBr) which may simultaneously pass both a wavelength of a visible ray and a wavelength of a far-infrared ray.

When the image sensor 10 of FIG. 2A operates as a part of the light field camera together with the lens array 15, the image sensor 10 may generate data corresponding to a 3D thermal image or a 2D thermal color image, and an ISP 30 may include a module (not shown) for processing the data.

Figure 9:
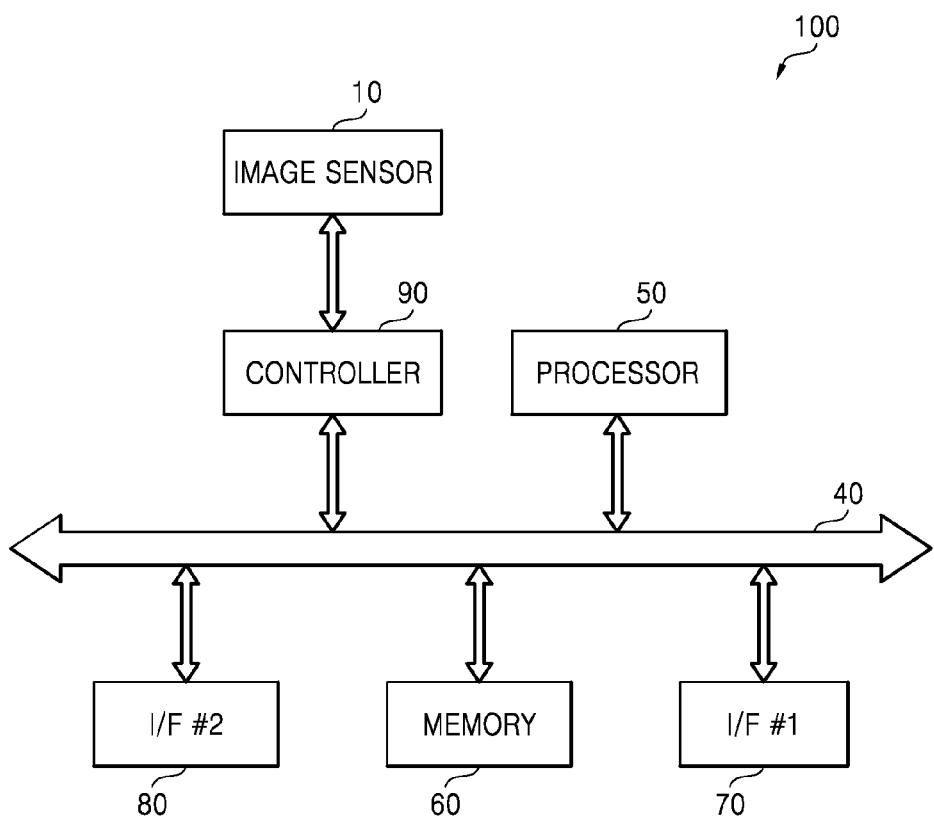
FIG. 9 is a block diagram of an image processing device including the image sensor illustrated in FIG. 1.

FIG. 9 is a block diagram of an image processing device including the image sensor illustrated in FIG. 1. Referring to FIG. 9, an image processing device 100 which may also be called an image pick-up device includes a processor 50 connected to a system bus 40, a memory device 60, a first interface 70, a second interface 80, a controller 90 and the image sensor 10 which is controlled by a controller 90.

The processor 50 generally controls an operation of the image processing device 100. The processor 50 controls an operation of the controller 90 by communicating with the controller 90. The processor 50 may control a data write operation and/or a data read operation of the memory device 60.

The memory device 60 may store image data processed by the image sensor 10. The first interface 70 may be an input/output interface. In this case, the processor 50 may control an operation of reading data stored in the memory device 60 and transmitting the data to the outside through the first interface 70. The processor 50 may also control an operation of storing data input from outside through the first interface 70 in the memory device 60.

The first interface 70 may be a display controller which may control operation of a display. For example, the display controller may transmit data processed by the image sensor 10 to the display according to a control of the processor 50.

The second interface 80 may be a wireless interface. In this case, the processor 50 may control an operation of reading data stored in the memory device 60 and transmitting data to the outside by radio through the second interface 80. The processor 50 may also control an operation of storing data input from the outside by radio through the second interface 80 in the memory device 60.

The controller 90 may control an image sensing operation and a processing operation of the image sensor 10, and control a signal conversion operation, e.g., at least one of a correlated double sampling operation and an analog to digital conversion operation.

The image processing device 100 may be a portable application or portable device including an image sensor. The portable application may be a handheld computer, a digital camera, a mobile phone, a smart phone or a tablet PC, etc.

Figure 10:
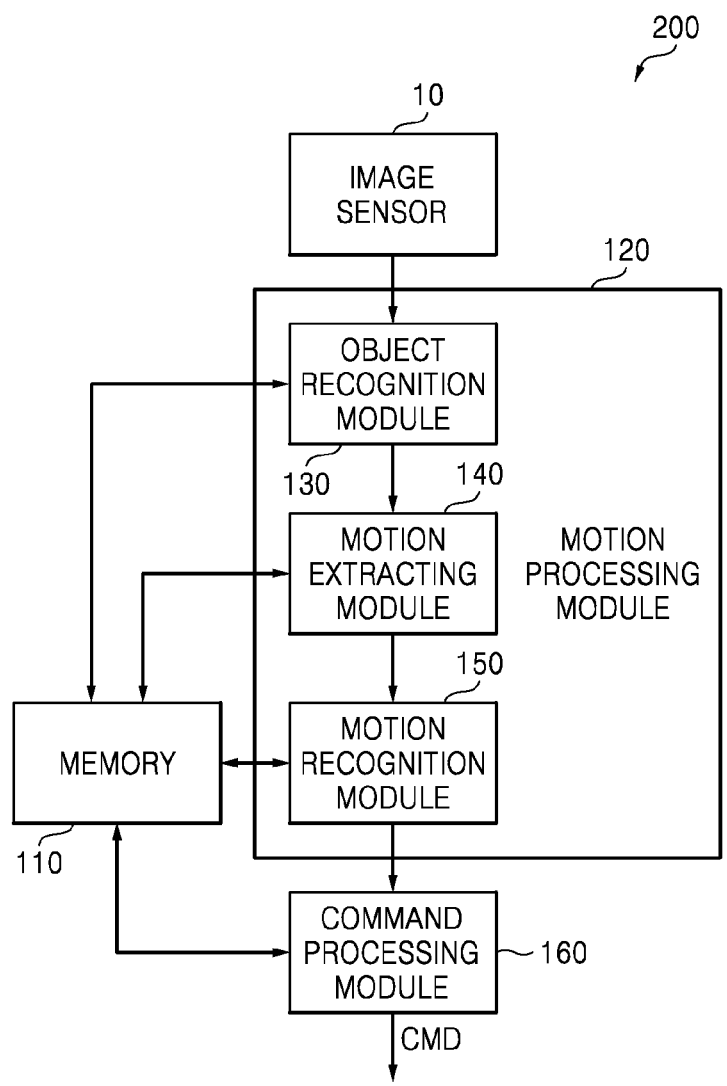
FIG. 10 is a block diagram of a user interface device including the image sensor illustrated in FIG. 1.

FIG. 10 is a block diagram of a user interface device including the image sensor illustrated in FIG. 1. Referring to FIGS. 1 and 9, a user interface device 200 includes the image sensor 10, a memory 110, an operation processing module 120 and a command processing module 160.

The memory 110 may store data necessary for processing object recognition, motion extracting, motion recognition and/or a command process. According to an example embodiment, the memory 110 may store a plurality of reference motions and a mapping table, e.g., a look-up table, including a command corresponding to the plurality of reference motions.

The motion processing module 120 includes an object recognition module 130, a motion extracting module 140 and a motion recognition module 150.

The object recognition module 130 may separate an object 8 and a background from an image which is processed in the image sensor 10 and output. The background includes the parts of an image except for an object 8 which the image sensor 10 intends to recognize.

The motion extracting module 140 may extract a motion of an object 8 from a change according to time of an image of a separated object 8. According to an example embodiment, the motion extracting module 140 may analyze the change according to a unit time and extract a motion of an object 8.

The motion recognition module 150 may compare an extracted motion with a plurality of reference motions stored in the memory 110, and recognize which reference motion the extracted motion corresponds to, e.g., what the extracted motion is. According to an example embodiment, the motion processing module 120 may not include the motion recognition module 150.

The command processing module 160 may generate a command signal CMD corresponding to a motion which the motion recognition module 150 recognizes by using a mapping table, e.g., a look-up table, stored in the memory 110.

According to an example embodiment, the command processing module 160 may compare a motion extracted by the motion extracting module 140 with a plurality of reference motions using a mapping table, e.g., a look-up table, stored in the memory 110, and generate a command signal CMD based on a result of the comparison.

Figure 11:
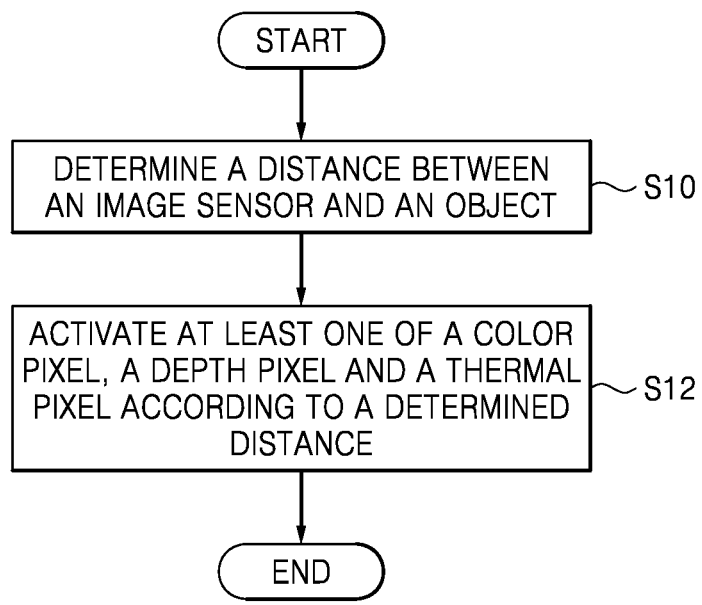
FIG. 11 is a flowchart illustrating a method of operating the image sensor illustrated in FIG. 2B according to an example embodiment of the inventive concepts.

FIG. 11 is a flowchart illustrating a method of operating the image sensor illustrated in FIG. 2B according to an example embodiment of the inventive concepts. Referring to FIGS. 2B and 10, when a pulse of light, e.g., a near-infrared ray, generated in the light source 12 is reflected by an object 8, the image sensor 10' may determine a distance between the image sensor 10' and the object 8 by sensing a reflected pulse of light (S10). According to an example embodiment, the image sensor 10' may determine a distance between the image sensor 10' and the object 8 in other ways.

According to a received determined distance, at least one of the color pixel array 14a, the depth pixel array 14b and the thermal pixel array 14c may be activated (S12).

According to an example embodiment, the control unit 16 may generate a plurality of row control signals XC, e.g., row address signals, for activating at least one of the color pixel array 14a, the depth pixel array 14b and the thermal pixel array 14c according to data ZD, where data ZD includes information on a determined distance. According to an example embodiment, the control unit 16 may generate a plurality of column control signals YC, e.g., column address signals, for outputting sensing signals generated from at least one of the color pixel array 14a, the depth pixel array 14b and the thermal pixel array 14c according to the data ZD, where data ZD includes information on the determined distance.

FIG. 12 is a flowchart illustrating a method of operating the image sensor illustrated in FIG. 2B according to another example embodiment of the inventive concepts. Referring to FIGS. 2B and 11, when a pulse of light, e.g., a near-infrared ray, generated in the light source 12 is reflected by an object 8, the image sensor 10' may determine a distance between the image sensor 10' and the object 8 by sensing a reflected pulse of light (S20).

According to an example embodiment, the control unit 16 may determine if a determined distance is longer (or greater) than a reference distance (S22). According to an example embodiment, the reference distance may be stored in a memory (not shown).

When a determined distance is longer (or greater) than a reference distance, the color pixel array 14a and the depth pixel array 14b may be activated (S24).

According to an example embodiment, when a determined distance is longer (or greater) than a reference distance, the control unit 16 may generate a plurality of row control signals XC, e.g., row address signals, for activating the color pixel array 14a and the depth pixel array 14b.

In this case, the control unit 16 may generate a plurality of column control signals YC, e.g., column address signals, for outputting sensing signals generated from the color pixel array 14a and the depth pixel array 14b.

When a determined distance is shorter (or less) than a reference distance, the thermal pixel array 14c may be activated (S26). According to an example embodiment, when a determined distance is shorter (or less) than a reference distance, the control unit 16 may generate a plurality of row control signals XC, e.g., row address signals, for activating the thermal pixel array 14c. In this case, the control unit 16 may generate a plurality of column control signals YC, e.g., column address signals, for outputting sensing signals generated from the thermal pixel array 14c.

A method and an apparatus according to an example embodiment of the inventive concepts may generate an improved 3-D image, a 3-D color image, a 3-D thermal image or a 2-D thermal color image. In addition, a method and an apparatus according to at least one example embodiment of the inventive concepts may execute better operation recognition.

Moreover, a method and an apparatus according to an example embodiment of the inventive concepts may reduce power consumption of the image sensor by using a thermal pixel if a distance between an image sensor and an object is shorter than a reference distance.

While the inventive concepts have been particularly shown and described with reference to example embodiments thereof, it will be understood by those of ordinary skill in the art that various changes in forms and details may be made therein without departing from the scope of the following claims.

What is claimed is:

1. An operation method of an image sensor comprising:
   determining a distance between the image sensor and an object;
   activating at least one of a color pixel, a depth pixel and a thermal pixel included in a pixel array of the image sensor based on the determined distance and a reference distance, wherein the activating includes activating the thermal pixel if the determined distance is shorter than the reference distance and activating the color pixel and the depth pixel if the determined distance is longer than the reference distance.

2. An image sensor comprising:
   a pixel array, the pixel array including,
      a color pixel configured to detect color information of an object,
      a depth pixel configured to detect depth information of the object, and
      a thermal pixel configured to detect thermal information of the object; and
   a processor configured to determine a distance to the object based on the depth information, activate the thermal pixel if the determined distance is shorter than a reference distance, and activate the color pixel and the depth pixel if the determined distance is longer than the reference distance.

3. The image sensor of claim 2, wherein the color pixel and the depth pixel are included in a first unit pattern and the thermal pixel is included in a second unit pattern.

4. The image sensor of claim 2, wherein each of the color pixel, the depth pixel and the thermal pixel is included in different layers.

5. The image sensor of claim 2, wherein the color pixel and the depth pixel are included in a first layer and the thermal pixel is included in a second layer.

6. The image sensor of claim 5, wherein the first layer includes a plurality of unit patterns and each of the plurality of unit patterns includes the color pixel and the depth pixel.

7. An image processing device comprising:
   the image sensor of claim 2; and
   a light source configured to generate light detected by the depth pixel.

8. A portable device comprising:
   the image sensor of claim 2; and
   a display configured to display an image based on an output signal output from the image sensor.

9. A user interface device comprising:
   the image sensor of claim 2, wherein the processor is configured to
      recognize the object based on at least one of the color information, the depth information and the thermal information,
      extract a motion of the object from a recognized object, and
      compare an extracted motion with a plurality of reference motions stored in a memory and generate a command signal based on a result of the comparison.

10. The user interface device of claim 9, wherein the user interface device is a console game controller.

11. An image sensor comprising:
    a color pixel;
    a depth pixel;
    a thermal pixel; and
    a processor configured to determine a distance to an object based on depth information from the depth pixel, and activate the thermal pixel and deactivate the color pixel and the depth pixel if the determined distance is less than a reference distance.

12. The image sensor of claim 11, further comprising:
a light source configured to generate light detected by the depth pixel.

13. The image sensor of claim 11, wherein the processor is configured to activate the color pixel and the depth pixel and deactivate the thermal pixel if the distance between the object and the image sensor is greater than or equal to the reference distance.

14. The image sensor of claim 11, wherein the thermal pixel is in a thermal pixel array of the image sensor, the depth pixel is in a depth pixel array of the image sensor, and the color pixel is in a color pixel array of the image sensor.

15. The image sensor of claim 11, wherein the color pixel is in a first unit pattern, the depth pixel is in a second unit pattern, and the thermal pixel is in third unit pattern.

* * * * *